May 19, 1959  K. F. RENTSCHLER  2,887,027
SHUTTER FOR A PHOTOGRAPHIC CAMERA
Filed Oct. 14, 1953  2 Sheets-Sheet 1
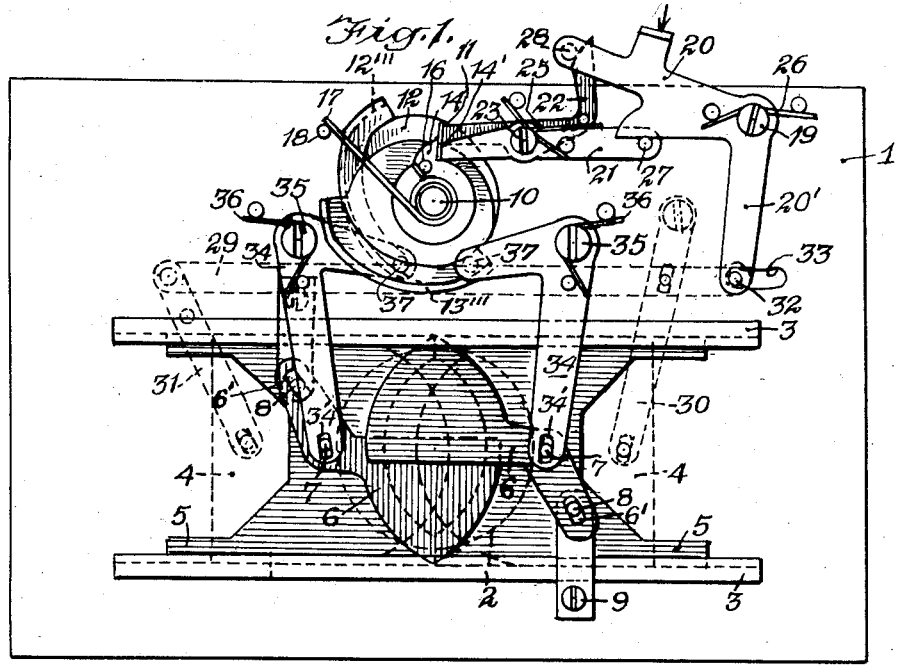
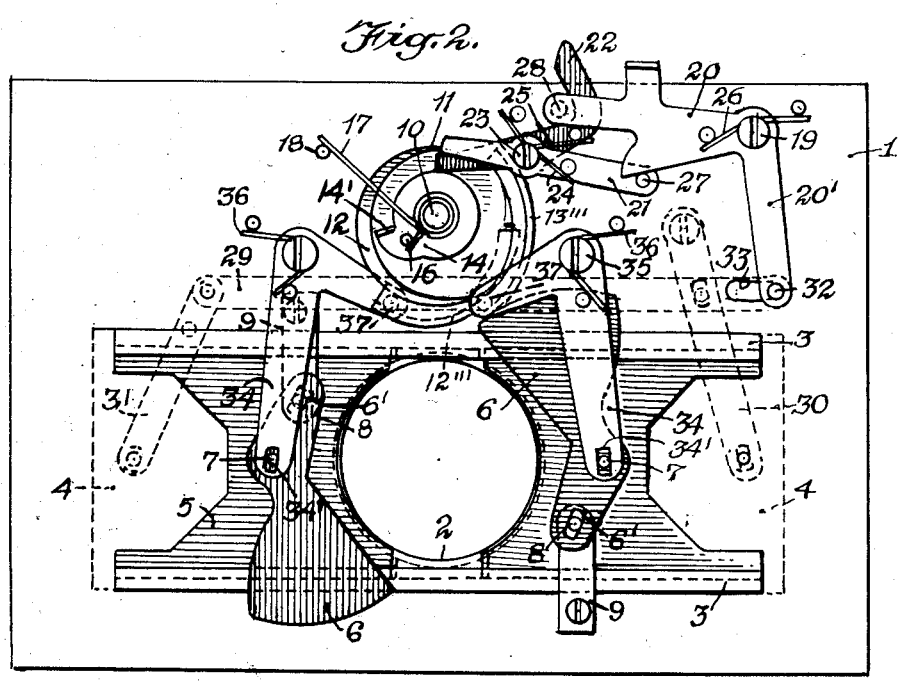
INVENTOR
*Karl F. Rentschler*
BY
*Sylvester J. Liddy &
Arthur L. Nathanson* ATTORNEYS May 19, 1959 K. F. RENTSCHLER 2,887,027
SHUTTER FOR A PHOTOGRAPHIC CAMERA
Filed Oct. 14, 1953 2 Sheets-Sheet 2
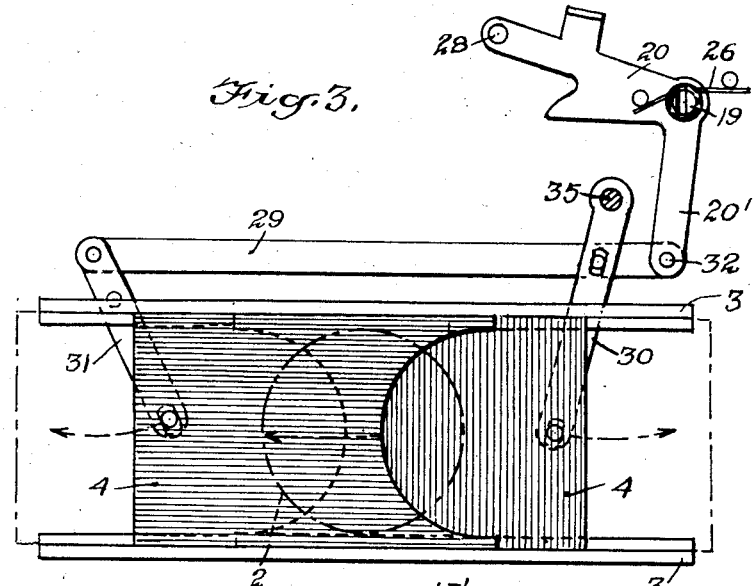
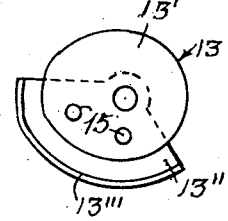
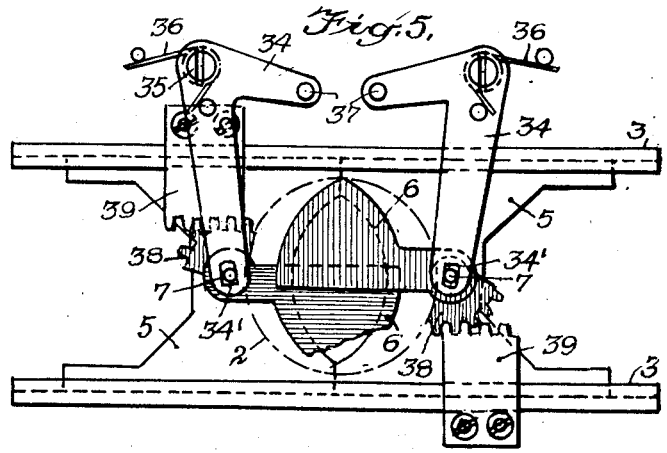
INVENTOR
Karl F. Rentschler
BY
Sylvester J. Liddy &
Arthur L. Nathanson ATTORNEYS

United States Patent Office 2,887,027
Patented May 19, 1959

2,887,027

SHUTTER FOR A PHOTOGRAPHIC CAMERA

Karl F. Rentschler, Calmbach (Enz), Germany, assignor to Alfred Gauthier G.m.b.H., Calmbach (Enz), Germany, a corporation of Germany Application October 14, 1953, Serial No. 385,917

Claims priority, application Germany November 5, 1952

8 Claims. (Cl. 95—60)

This invention relates to a novel shutter for a photographic camera.

For certain types of cameras, especially those of the interchangeable lens type, there are used preferably focal plane shutters, due to the fact that in case of comparatively large shutter apertures as they are required for lenses having a great focal length, a between-the-lens shutter of usual structure is not suited to guarantee shutter speeds as fast as they are necessary. However, focal plane shutters have disadvantages in comparison with between-the-lens shutters. In addition to the well known optical drawbacks there has arisen another drawback caused by the development of the flash photography. The bare synchronization of all shutter speeds with flash lamps having wire and metal foil-filling causes many more difficulties in the case of a focal plane shutter than in the case of a between-the-lens shutter. Also of still more consequence is the fact that electronic flashes cannot be synchronized with fast and fastest shutter speeds of focal plane shutters, because the short illumination time of this flash type (1/500 to 1/5000 sec.) requires a fully opened shutter aperture. But this condition is only warranted for shutter speeds up to 1/30 sec. or 1/50 sec., which causes considerable drawbacks.

The principal object of the present invention is the provision of a shutter having a comparatively large aperture, allowing more favorable results regarding the shutter speeds in comparison with between-the-lens shutters of known structure, the instant shutter being free of the disadvantages of a focal plane shutter.

In accordance with the foregoing object, use is made of a shutter having two groups of shutter blades no one of which covers completely the aperture of the shutter, but each group closes the remaining opening of the other group of shutter blades. The distinguishing feature of this invention is the existence of driving members which are in engagement with other members, and these latter members are provided for the actuation of one shutter blade of one group and of the corresponding shutter blade of the other group. To save space and to obtain a rugged construction of the shutter, the shutter blades may be pivoted on the members which are connected with the driving members. For the connection between both groups of shutter blades there may be provided, preferably, connections consisting of pins and slots, or gear connections.

For actuating the shutter blades there may be used a spring actuated member which is designed and adapted to rotate one full revolution. On this member there are arranged, preferably, cams for opening and closing the shutter blades. Furthermore, the opening cam may be formed in such a way that it influences the shutter blades only after an initial angular movement of the fully rotating member. Also the closing cam may be so designed that it influences the shutter blades positively according to the angular position of the fully rotating member, thereby obtaining a closing time of the shutter blades as short as any possible, while the opening cam assures the operation of the rotating member at high speed at the beginning of its influence on the shutter blades.

In order to obtain an absolute exclusion of light during the time that the camera is not in use, there are provided special cover blades which are opened by actuating the shutter trigger before releasing both of the aforesaid groups of shutter blades.

Embodiments of the present invention are shown by way of example in the accompanying drawings, in which:

Fig. 1 is a rear view of a shutter in accordance with the invention, the shutter being closed and the parts in a cocked relation.

Fig. 2 is a view similar to Fig. 1, but showing the shutter fully open.

Fig. 3 is a rear view of the cover blades and the parts for operating the blades.

Fig. 4 shows the blade control member.

Fig. 5 is a fragmentary rear view showing a modification of the means for transmitting the motion to the shutter blades.

In the drawings there is shown a base or mounting plate 1 with a shutter aperture 2. On the plate 1 there are mounted spaced parallel guide rails 3 which extend horizontally and respectively above and below the aperture 2 on opposite sides of the plate 1. Companion cover blades 4 are accommodated for sliding movement by the rails 3, as are one group of companion shutter blades 5. In order to reduce the mass, the shutter blades 5 are cut out at their ends. The inner ends of the blades 5 are cut out in the form of an arc, the radius of said arc being somewhat greater than the radius of the aperture 2.

A second group of companion shutter blades is provided, said blades being designated by the numeral 6. The first group of blades 5 is operatively connected with the second group of blades 6 by means of a motion transmission device. The shutter blades 6 are pivoted on pins 7 fixed on the blades 5 respectively. For transmitting motion to the blades 5 and 6, there are provided slots 6' in the blades 6, and pins 8 which are disposed in the slots 6', respectively, the pins 8 being secured to suitable supports 9, respectively, which are fixed on the plate 1.

Mounted on an arbor 10 on the plate 1 is a fully rotatable member 11 for actuating the shutter blades 5 and 6. The member 11 comprises three parts which are tightly and closely connected together. The three parts consist of elements 12 and 13, both of the same shape, and a locking element 14. The elements 12 and 13 include disk cams 12' and 13', respectively. The draft or contour of said cams consists partly of a circle concentric to the center of the disks, and partly by a curve whose points have a greater distance from the center than said circle. As will be seen from Fig. 4, there are segments 12'' and 13'' fixed on the cams, respectively, by means of rivets or screws 15, and said segments having flanges 12''' and 13''', respectively closely spaced to the disk cams and constituting therewith box cams with opposed surfaces, each flange being disposed at a right angle to the related cam disk and nearly parallel to the contour thereof. The locking element 14 has a nose with a bent up lug 14' and a pin 16. One end of a drive spring 17 bears on the pin 16 and its other end bears on a pin 18 on the plate 1. The body of the spring 17 encircles the arbor 10. The lug 14' cooperates with two levers, a lever 21 and a lever 22. The movement of the levers 21 and 22 is dependent upon the actuation of a shutter release lever 20 mounted on an arbor 19 on the plate 1. The levers 21 and 22 have the same fulcrum 23 on the plate 1. Springs 24 and 25 are employed in cooperation with the levers 21 and 22, respectively, to cause their return movement. Likewise, a spring 26 is employed to cause the return movement of the shutter release lever 20. The lever 21 has a pin 27 projecting laterally therefrom. By pressing the release lever 20 down, and through the intervention of the pin 27, the lever 21 is caused to move in a clockwise direction against the pressure of the spring 24. In order to hold the lever 22 in the position in which it is shown in Fig. 1, that is out of engagement with the lug 14', there is arranged on the release lever 20 a pin 28 which is engaged by the lever 22 by the action of the spring 25. The release lever 20 has an arm 20'. In order to slide the cover blades 4 toward and away from the aperture 2 there is provided motion transmission means as follows. A push and pull rod 29 has one end pivotally connected with a lever 31, and near the other end the rod 29 has a pin-and-slot connection with a lever 30 which has its upper end fulcrumed on the plate 1. The lower ends of the levers 30 and 31 have pin-and-slot connection with the cover blades 4, respectively. The arm 20' has a pin 32 with which the end of the rod 29 beyond the lever 30 is pivotally connected. The plate 1 has a slot 33 to accommodate the pin 32.

In order to operate the shutter blades 5 and 6 in response to the one-way or unidirectional rotation of the member 11, there are provided levers 34 which have their upper ends fulcrumed on the plate 1, as at 35. Springs 36 are employed in cooperation with the levers 34, respectively, to cause their return movement. The pins 7 project into slots 34' in the levers 34 respectively, thus providing pin-and-slot connections between the levers 34 and the shutter blades 5 and 6. These blades move toward and away from the aperture 2 between closing and opening positions. In the closing position the blades 5 partly close the aperture 2 and leave a lanceolate opening which is closed by the blades 6 in their closing position, thereby fully closing the aperature 2 as shown in Fig. 1. The blades 5 and 6 in their open positions are clear of the aperture 2 as shown in Fig. 2. Pins 37 on levers 34 engage cams 12' and 13'.

The manner of operation of the hereinabove described device is as follows. By pressing the release lever 20 down as indicated by the arrow in Fig. 1, the lever 20 rocks counterclockwise and the arm 20' pulls the rod 29 to the right, and through the intervention of the levers 30 and 31, the cover blades 4 are moved into fully open position clear of the aperture 2. This occurs before the lever 21, through the intervention of the pin 27, is moved clockwise far enough to disengage the lever 21 from the lug 14'. As the lever 21 continues to move it releases the member 11 to the action of the spring 17, whereupon the member 11 rotates clockwise one full revolution. This causes the cams 12' and 13', acting on the pins 37, to cause the forward operation of the levers 34 which in turn move the shutter blades 5 and 6, through the intervention of the pins 7 and slots 34', into open position clear of the aperture 2. Due to the shape of the cams 12' and 13' there is no movement of the levers 34 by said cams within one hundred and fifty degrees from the beginning of the rotation of the member 11. Thus it is possible to accelerate rotation of the member 11 during the early phase to a high rate of speed for the operation of the levers 34 and the rapid movement of the blades 5 and 6 into open position clear of the aperture 2 within a very short time interval.

In Fig. 2, the relationship of the blades is such at the moment when the aperture 2 is fully open or unobstructed. At that moment the flanges 12''' and 13''' have already engaged the pins 37 of the levers 34. For this reason the levers 34 are given return movement by the member 11 in dependence on the shape of the cams 12' and 13' respectively, and the flanges 12''' and 13''' respectively. By cooperation of both groups of shutter blades, the aperture 2 is fully closed by the blades after an open time interval which depends upon the shape of the cams. After the member 11 has made one complete revolution it is stopped by the lever or pawl 22 which is then free of the pin 28 to engage the lug 14', until the lever 21 under the influence of tensioned spring 24 reengages the lug and prevents rotation of the member 11 further in a clockwise direction. Also during the return of the lever 20 the blades 4 are returned to the closed position. The shutter may be cocked by rotating the member 11 counter-clockwise one full revolution, and although the blades 5 and 6 move out of the aperture 2, the film will not be affected because the cover blades 4 remain closed.

In Fig. 5 there is shown toothed segments 38 on the blades 6 which mesh with racks 39 secured to the plate 1 in lieu of the slots 6', pins 8 and supports 9. The other parts shown in Fig. 5 are similar to certain parts shown in Fig. 1 and have similar reference numerals applied thereto.

It is to be understood that the arbor 10 of the member 11 may be connected with a manually operable cocking lever well known in the art, and it also may be connected with the film feeding mechanism.

Furthermore, instead of two groups of shutter blades shown a greater number of shutter blades for each group may be used. Also the shape of the shutter blades of both groups as well as the manner in which they are operated may be accomplished in different ways. For example, the blades 5 which have rectilinear movement may be fixed on the levers 34 to have curvilinear movement. In such case the guiding precision of the shutter blades 5 will be performed by the levers 34 with a minimum of friction.

Because the cover blades 4 in the closed position absolutely exclude all light, the shutter blades may be made from lightweight metal, such as aluminum alloy, so that the shutter blades will have a small inertia moment.

The shutter of the present invention is applicable not only to cameras having a comparatively large shutter aperture, but also to cameras of every kind; and the invention is not restricted to the details above described, but includes all constructions and modifications coming within the scope of the appended claims.

I claim:

1. In a photographic camera shutter structure having an exposure aperture and having two groups of shutter blades, neither of said groups by itself covering completely the said aperture of the shutter structure and each one of said groups of shutter blades closing the remaining opening formed by the other group, thereby to completely cover said aperture, a drive member comprising a box cam having opposed surfaces; a pair of levers turnable about fixed pivots and directly engaging said surfaces of the drive member, each of said levers actuating a different shutter blade of the one group and also a different shutter blade of the other group, for causing the opening and closing movement of the shutter blades of both groups upon the operation of the drive member in one unchanged direction and engagement of said levers with the said opposed surfaces one after another, effecting forward and return movements of the levers.

2. A photographic camera shutter according to claim 1, wherein the shutter blades of both groups are pivotally connected with said levers respectively.

3. A photographic camera shutter according to claim 1, wherein the drive member is rotatable and drivingly biased by a spring.

4. The invention as defined in claim 1 in which each group of shutters comprises a pair separate from the other group, in which there are means pivotally mounting one group of blades and means mounting the other group of blades for rectilinear movement, in which the drive member is rotatable and spring-actuated, and in which the said levers engage the blades of one of the said groups.

5. A photographic camera shutter according to claim 4, wherein the shutter blades of one pair are connected with the shutter blades respectively of the other pair by pin and slot connections.

6. The invention as defined in claim 1 in which the drive member has closely spaced cams rigid with each other and constituting the said opposed surfaces, and in which the levers have pins engaging the said surfaces.

7. The invention as defined in claim 6 in which the drive member is rotatable, and in which one of said cams has a driving surface operable on the associated lever pin only after an initial angular movement of the driving member.

8. The invention as defined in claim 1 in which there are means mounting one group of blades for pivotal movement, and in which there are guide means mounting the other group of blades for sliding movement.

References Cited in the file of this patent

UNITED STATES PATENTS

| | | |
|---|---|---|
| 331,494 | Hadden | Dec. 1, 1885 |
| 652,295 | Shakespeare et al. | June 26, 1900 |
| 1,422,460 | Marks | July 11, 1922 |
| 1,510,597 | Klein | Oct. 7, 1924 |
| 2,165,574 | Pirwitz | July 11, 1939 |
| 2,231,094 | Seifert | Feb. 11, 1941 |
| 2,326,077 | Steiner | Aug. 3, 1943 |
| 2,371,072 | Simmon et al. | Mar. 6, 1945 |
| 2,531,034 | Doyle | Nov. 21, 1950 |

FOREIGN PATENTS

| | | |
|---|---|---|
| 13,844 | Great Britain | of 1887 |
| 155,213 | Great Britain | Mar. 10, 1922 |